United States Patent
Matsuura

[19]

[11] Patent Number: 5,805,234
[45] Date of Patent: Sep. 8, 1998

[54] TELEVISION RECEIVER

[75] Inventor: Katsuji Matsuura, Kanagawa, Japan

[73] Assignee: Sony Corporation, Tokyo, Japan

[21] Appl. No.: 819,114

[22] Filed: Mar. 17, 1997

Related U.S. Application Data

[62] Division of Ser. No. 515,449, Aug. 15, 1995, Pat. No. 5,614,956.

[30] Foreign Application Priority Data

Aug. 16, 1994 [JP] Japan .................................. 6-214209

[51] Int. Cl.$^6$ ...................................................... H04N 5/46
[52] U.S. Cl. ........................... 348/558; 348/556; 348/913
[58] Field of Search .......................... 348/558, 554–557, 348/563, 564, 913, 476, 704, 473, 434; H04N 5/46

[56] References Cited

U.S. PATENT DOCUMENTS

| | | | |
|---|---|---|---|
| 5,249,049 | 9/1993 | Kranawetter et al. | 348/913 |
| 5,347,318 | 9/1994 | Kobayashi et al. | 348/558 |
| 5,455,631 | 10/1995 | Nakajima | 348/478 |
| 5,467,142 | 11/1995 | Ichinokawa | 348/556 |
| 5,581,304 | 12/1996 | Wang | 348/556 |
| 5,675,389 | 10/1997 | Oda | 348/556 |
| 5,686,969 | 11/1997 | Bailk | 348/556 |
| 5,686,979 | 11/1997 | Tani et al. | 348/558 |

*Primary Examiner*—Michael Lee
*Attorney, Agent, or Firm*—Jay H. Maioli

[57] ABSTRACT

A wide display scream television receiver having a plurality of video display modes, the optimum display mode is automatically selected depending on a kind of material of an input video signal includes a display control for displaying a picture corresponding to the input video signal on the display screen in a plurality of display modes by controllably changing a size of the picture in the horizontal direction and/or vertical direction. The number of horizontal lines from the heading line of each field of the input video signal is counted up with a counter. A detection region setting circuit respectively sets, in the upper and lower regions and the center region of the display screen, the detection region in the predetermined range designated by a single line to a plurality of lines for each field of the input video signal on the basis of the counted value of the counter. Existence of the picture is detected by a video existence detecting circuit in a plurality of detection regions preset by the detection region setting circuit. On the basis of the detected output of the video signal existence detection circuit, any one of a plurality of display modes can be selected.

5 Claims, 7 Drawing Sheets

F I G. 4

|  | Da | Db | Dc | Dd |
|---|---|---|---|---|
| NORMAL (4:3) | 1 | 1 | 1 | 1 |
| VISTA (16:9) | 0 | 1 | 1 | 0 |
| CINEMASCOPE | 0 | 1 | 0 | 0 |

F I G. 6A
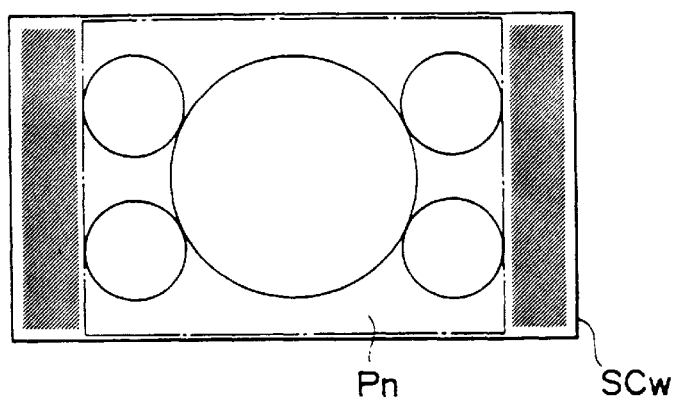
F I G. 6B
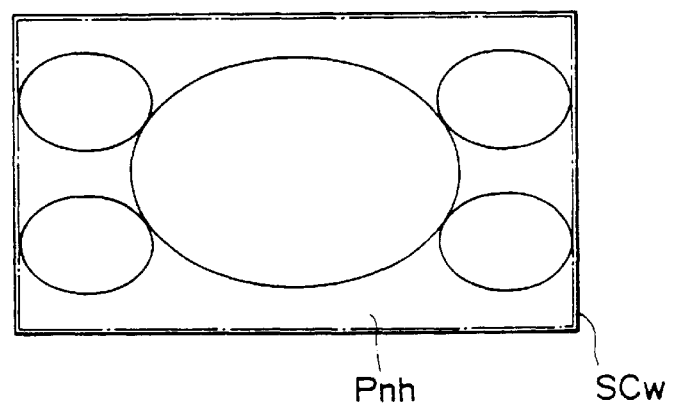
F I G. 6C
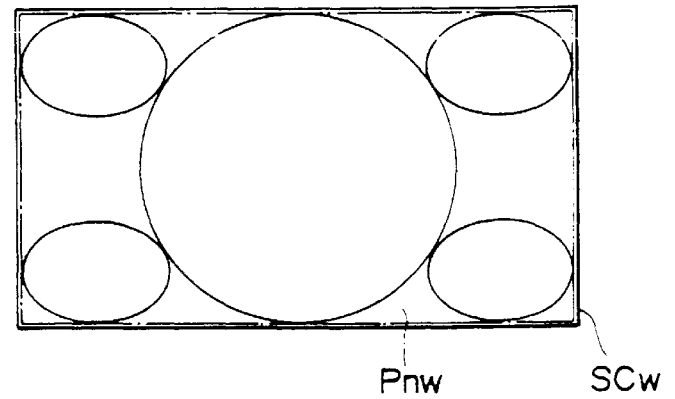

TELEVISION RECEIVER

This is a division of application Ser. No. 08/515,449 filed Aug. 15, 1995 now U.S. Pat. No. 5,614,956.

BACKGROUND OF THE INVENTION

1. Field of the Invention

The present invention relates to a television receiver which is suitable for a picture tube having an aspect ratio (a ratio of horizontal side to vertical side of the display screen of a picture tube), for example, of 16:9.

2. Description of Related Art

In the current standard television system (for example, the NTSC system, etc.), the aspect ratio is determined, as is well known, to 4:3 (ratio value is 1.33). Moreover, in the newly proposed high-definition television (Hi-Vision) system , since the aspect ratio is determined to 16:9 (ratio value is 1.78), the lateral side of the display screen is wider than that in the NTSC system.

In these years, software for such a wide display screen is increasingly put into application. In this case, materials of movie programs for a wide display screen of the so-called vista size (aspect ratio value is 1.85) and CinemaScope size (aspect ratio value is 2.35) are accommodated in the screen in the letter box type with the aspect ratio of 4:3 without any trimming. Moreover, television broadcast programs for wide display screen are also increasing in numbers as well as the programs where the Hi-Vision broadcast signal is down-converted to the NTSC signal.

In compliance with the increase of such software and broadcast programs for the wide display screen, a wide display screen television receiver, which employs a picture tube with the aspect ratio of 16:9 and 525 scanning lines corresponding to the NTSC system and which is also called a laterally wide television receiver or just as a wide television receiver, has been made available in the market.

On the occasion of displaying the software of movie programs for wide display screen on the television receiver of the NTSC system, the blanking period wherein any video or picture information is not included is often inserted at the upper and the lower portions of the display screen. For example, when a program is displayed on the receiver utilizing a picture tube having the aspect ratio of 4:3, a wide picture Pw is displayed fully in the horizontal direction on the display screen of the picture tube (hereinafter called the standard display screen. A picture having the aspect ratio of 4:3 is called the standard picture.) SCn as shown in FIG. 5A and the blanking region is formed at the upper and lower portions of the standard display screen SCn corresponding to the blanking period not including any picture information as indicated by the hatched areas in FIG. 5A.

Moreover, when software for the wide display screen is displayed on a wide display screen television receiver, the blanking regions are also formed at the upper and lower portions of the wide display screen SCw of the television receiver. Therefore, in the wide television receiver, for example, as described in the Laid-Open Publication No. Hei 2-305190 laid opened on Dec. 18, 1990, it is detected that the relevant software is a wide picture program of the vista size and CinemaScope size or not, depending on the length of the blanking period not including any picture information. When the program is detected as software for the wide display screen, the vertical amplitude is expanded for display on the wide display screen SCw.

For instance, in the case of a material of vista size program, as shown in FIG. 5B, a widely expanded picture Pzv is displayed almost in the full size of wide display screen SCw of the television receiver by expanding the vertical amplitude with a rate of the aspect ratio of the wide display screen SCw having the aspect ratio of 16:9 and the vista size display screen.

In the present specification, a mode where a wide picture Pzv expanded in the vertical direction is displayed in full size of the wide display screen SCw as shown in FIG. 5B is called the zoom mode.

In the case of this zoom mode, the blanking regions formed at the upper and lower portions of the display screen are located outside the wide display screen SCw and only the desired picture is expanded and displayed in full size of the display screen to enhance the feeling of being at the live performance at the time of watching the television program.

Moreover, in the case of letter box type software, the positions of pictures accommodated are different depending on the software and when software offers a foreign movie, a superimposed dialogue translated into Japanese is usually inserted at the lower part of the display screen. Therefore, the center of expansion in the vertical direction cannot be fixed. Accordingly, in the case of the zoom mode in the wide display screen television receiver, the display screen can be scrolled in the vertical direction up to the condition where only the upper end or lower end portions of the expanded picture Pzv is lost by changing the phases of the vertical synchronous signal and video signal.

Meanwhile, in the case of the wide display screen television receiver, when the standard picture Pn having the aspect ratio of 4:3 is displayed in the full size of the wide display screen SCw in the vertical direction with such aspect ratio kept unchanged, the blanking regions are formed at both right and left end portions of the display screen SCw as shown in FIG. 6A.

In the present specification, the mode where the standard picture as shown in FIG. 6A is displayed fully on the wide display screen SCw in the vertical direction with the aspect ratio of 4:3 kept unchanged is called the normal mode.

In this normal mode, the wide display screen is not used in its full size, but even if the standard picture is simply expanded in the horizontal direction as shown in FIG. 6B, the geometrical fidelity of the picture is deteriorated, providing an elongated picture Pnh.

Therefore, a wide mode technology has been developed. In this mode, the standard picture can be naturally displayed on the wide display screen without any sense of incongruity by expanding both right and left end sides in the horizontal direction while the center of the display region is kept unexpanded to eliminate the blanking regions in the right and left sides in the normal mode in view of enjoying the standard picture with the wide display screen.

In the case of this wide mode, the picture is a little expanded in the vertical direction and the vertical linearity is compressed at both upper and lower end portions of the display screen.

Cited reference: "Wide Television" by Ohnishi Proceedings of Japanese Society of Television, No. 7, Vol. 47 (July, 1993)

SUMMARY OF THE INVENTION

As described previously, a wide display screen television receiver provides various display modes and these display modes have been changed as required by a viewer through operation of a remote control transmitter.

However, a wide display screen television receiver has problems that a television viewer cannot select a display mode until he watches the picture displayed on the television receiver and moreover it is not always easy for a television viewer to select the optimum display mode depending on the kind of software and television broadcast program materials and thereby he cannot sufficiently enjoy the programs displayed.

In order to eliminate the problems explained above, several effective methods have been proposed. In a preferential method of these, an identification information for identifying a kind of program materials is inserted, in the broadcasting or software manufacturing side, within the blanking period of the video signal, for example, into the lines 20 and 283 of the format as indicated in FIG. 7, while the display mode is then automatically changed in the wide television receiver side on the basis of such identification information.

However, here rises a problem that this method cannot immediately be put into practical use because it cannot be introduced effectively until all measures are established in the broadcasting and software manufacturing sides.

Meanwhile, it is required, for the television receiver side, to provide a decoder for automatic change of display mode, resulting in a problem that a cost increases inevitably.

Considering the measures for overcoming the problems explained previously, it is therefore an object of the present invention to provide a television receiver which can automatically select the optimum display mode at a low cost depending on a kind of the software materials to be displayed.

In view of solving the aforementioned problems, a television receiver of the present invention comprises video signal input means which allows input of the video signal having a plurality of different kinds of aspect ratios, display control means for displaying a size or sizes in the vertical direction and/or horizontal direction of the video signal inputted from the video signal input means, video signal detecting means for detecting existence of the video signal in the detection region preset on the display screen and display mode selecting means for selecting any one of a plurality of display modes on the basis of the detected output of the video signal detecting means.

According to a structure of the present invention described previously, since the detected outputs Da to Dd of the video signal existence detecting means are different depending on a kind of the material of the input video signal, the optimum display mode for the material of the input video signal is automatically selected by the display mode selecting means on the basis of such detected output.

BRIEF DESCRIPTION OF THE DRAWINGS

FIG. 4 is a diagram for explaining operations of the essential portion of an embodiment of the present invention.

FIGS. 6A–6C are a conceptional diagrams for explaining the prior art.

DESCRIPTION OF THE PREFERRED EMBODIMENTS

A preferred embodiment of a television receiver of the present invention will be explained with reference to FIGS. 1 to 4. An entire structure of the preferred embodiment of the present invention is illustrated in FIG. 1, while a structure of the essential portion thereof is illustrated in FIG. 2.

Figure 1:
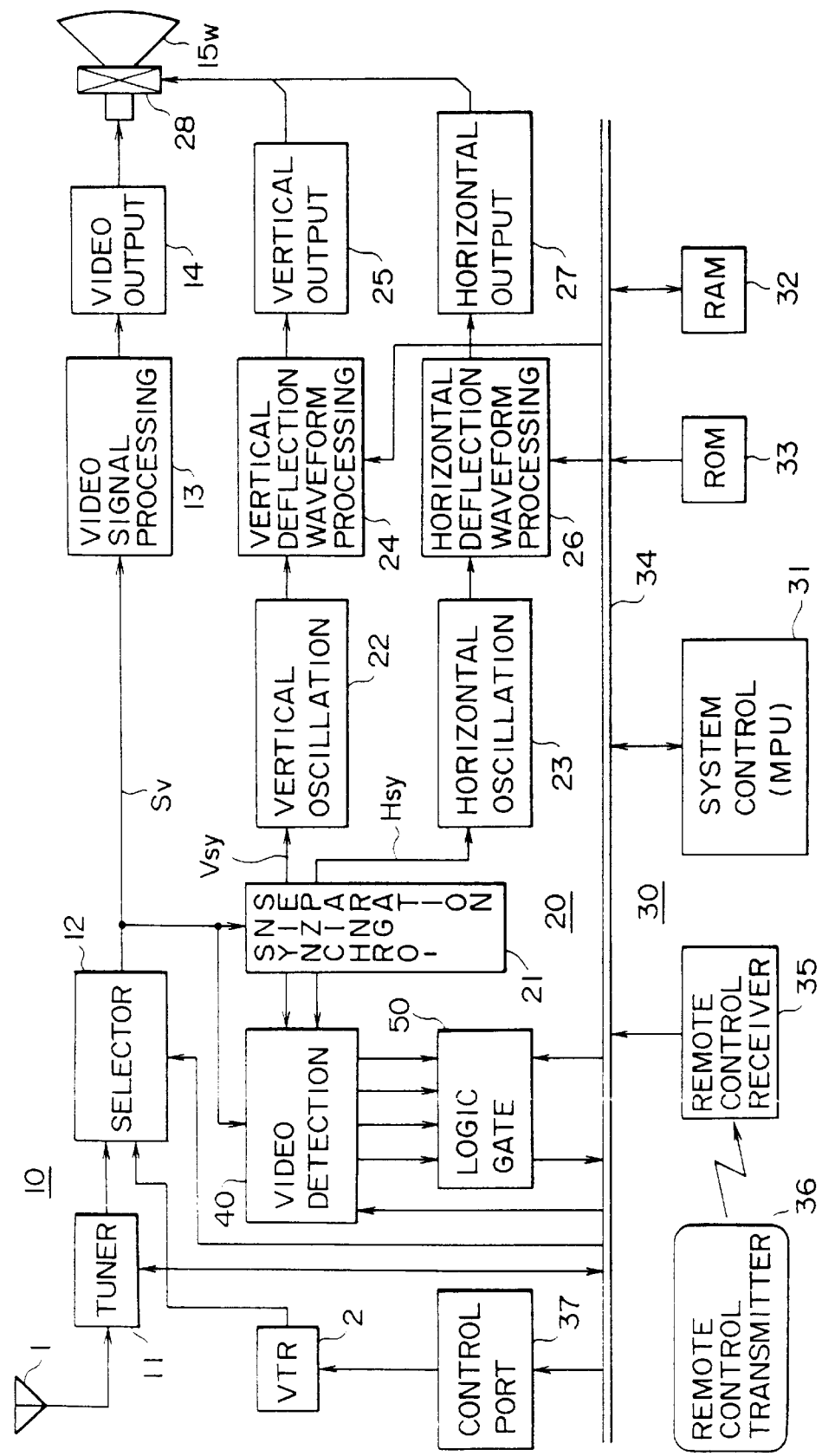
FIG. 1 is a block diagram illustrating an entire structure of an embodiment of a television receiver of the present invention.
Figure 2:
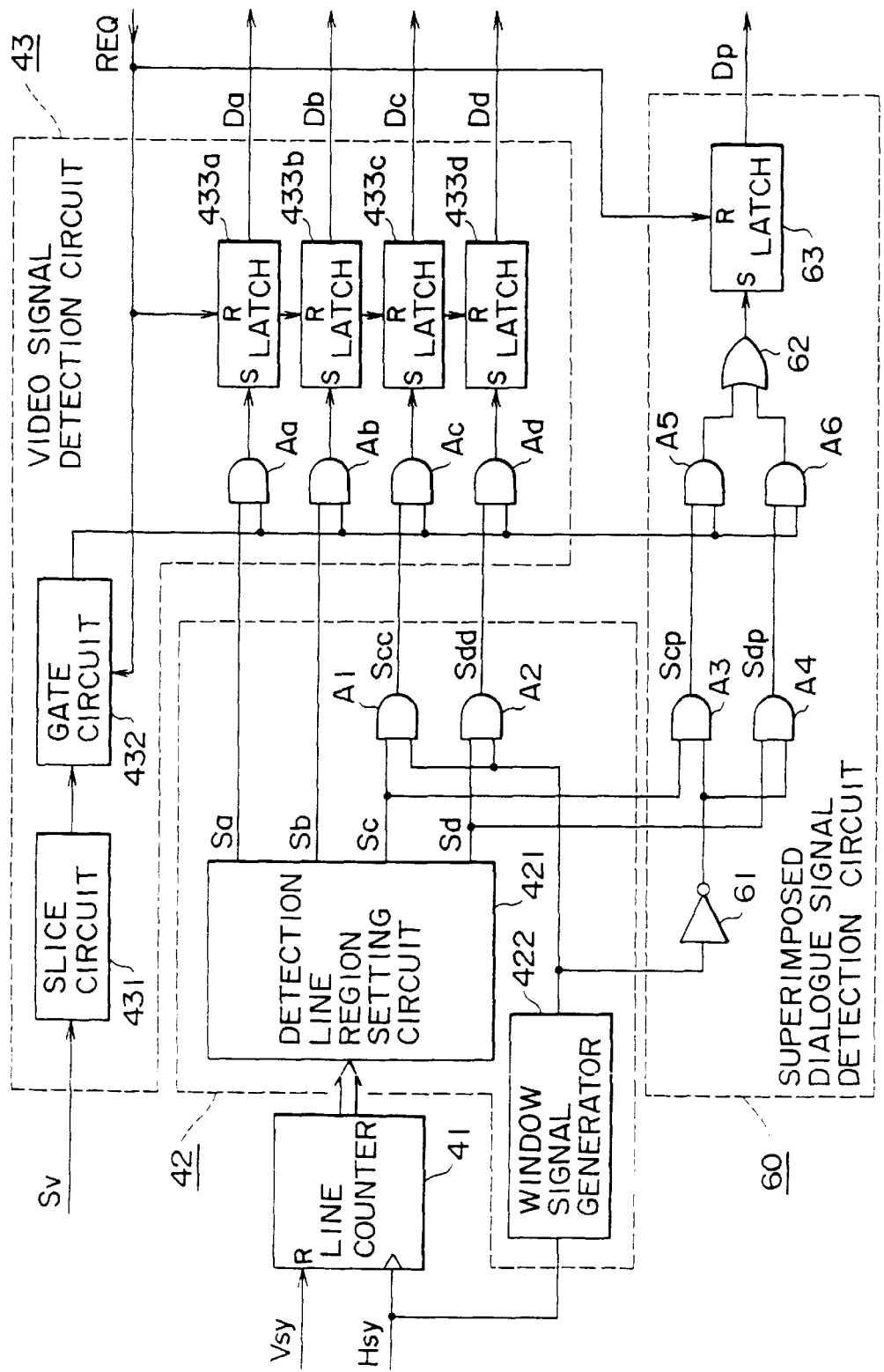
FIG. 2 is a block diagram illustrating a structure of the essential portion of an embodiment of the present invention.

In FIG. 1, the reference numeral 10 designates a signal system. For example, a broadcast signal received by an antenna 1 is supplied to a tuner 11 for selection of the broadcast signal of the desired channel. The tuner 11 includes an intermediate frequency circuit and a video demodulator (not illustrated). A video signal from the tuner 11 and a video signal from an external VTR 2 are supplied to a video signal processing circuit 13 through a selector 12. After these video signals are processed as determined previously, these are supplied to a picture tube 15w having a wide display screen having the aspect ratio of 16:9 through a video output circuit 14.

The reference numeral 20 designates a deflection system, wherein the video signal Sv from the selector 12 is supplied to a synchronizing separation circuit 21. Vertical and horizontal synchronous signals Vsy, Hsy obtained from the separation circuit 21 are respectively supplied to vertical and horizontal oscillation circuits 22, 23. An output of the vertical oscillation circuit 22 is then supplied to a vertical output circuit 25 through a vertical deflection waveform processing circuit 24 and an output from the horizontal oscillation circuit 23 is supplied to a vertical output circuit 27 through a horizontal deflection waveform processing circuit 26. Thereby, outputs of both output circuits 25, 27 are then supplied to a deflection coil 28.

The reference numeral 30 designates a control system comprising a system control circuit (microprocessor MPU) 31, RAM 32 and ROM 33 which are connected respectively through a system bus 34. RAM 32 is mainly used as the work area and ROM 33 stores control programs and control data for respective circuits.

In this embodiment, an erasable/programmable EEPROM is used as ROM 33 to store the deflection control data for setting display screen and compensating for distortion corresponding to each display mode as explained above. This control data is supplied to both vertical and horizontal deflection waveform processing circuits 24, 26 under the control of the system control circuit 31.

The system bus 34 is connected with a so-called remote control receiver 35 for remote control. Therefore, a control data is inputted to system control circuit 31 by operation of a remote control transmitter 36, for example, of a infrared system through a decoder included in the remote control receiver 35 and an input/output port not illustrated.

Moreover, the external VTR 2 is connected to the system control circuit 31 through a control port 37 and bus 34 and the tuner 11, selector 12 and vertical and horizontal waveform processing circuits 24, 26 are also connected with the system control circuit 31 through an input/output port not illustrated.

Here, a voice signal system is not related to the present invention. Therefore, this voice signal system is neither illustrated nor explained for simplification of the explanation.

In this embodiment, a video detection circuit 40 and a logic gate circuit 50 as display mode selecting means are provided to determine the display mode explained above depending on an input video signal. To the video detection circuit 40, the video signal Sv from the selector 12 and the synchronous signals Vsy, Esy from the synchronizing separation circuit 21 are supplied and simultaneously a control signal from the system control circuit 31 is supplied. A detected output of the video detection circuit 40 is supplied to the logic gate circuit 50. An output of the logic gate circuit 50 is supplied to the system control circuit 31 through the bus 34.

The video detection circuit 40 in the present embodiment is structured as illustrated in FIG. 2, comprising a line counter 41, a detection region setting circuit 42 for generating a region signal to detect existence of a video signal, a video signal detecting circuit 43 and a superimposed dialogue signal detection circuit 60.

In FIG. 2, a vertical synchronous signal Vsy is supplied to the line counter 41 as a reset input and a horizontal synchronous signal Hsy is also supplied thereto as a clock. Therefore, the line counter 41 counts up to the current horizontal line to detect the horizontal line number from the first line of each field of the input video signal Sv. That is, the line counter 41 outputs the line number of each horizontal line in each field.

The detection region setting circuit 42 is composed of a detection line region setting circuit 421, a window signal generating circuit 422 for setting the detection area in the horizontal direction and AND gates A1, A2. The detection line region setting circuit 421 outputs, as will be explained later, an output signal which becomes "1" in the horizontal line period to detect existence of the video signal determined previously from the line number signal from the line counter 41.

The window signal generating circuit 422 and AND gates A1, A2 are provided to set the detection area so that the superimposed dialogue signal is not detected as existence of the video signal.

The video signal existence detection region in this embodiment will then be explained hereunder.

The inventors of the present invention have investigated the current television broadcast programs and video software and proved following facts.

Figure 3:
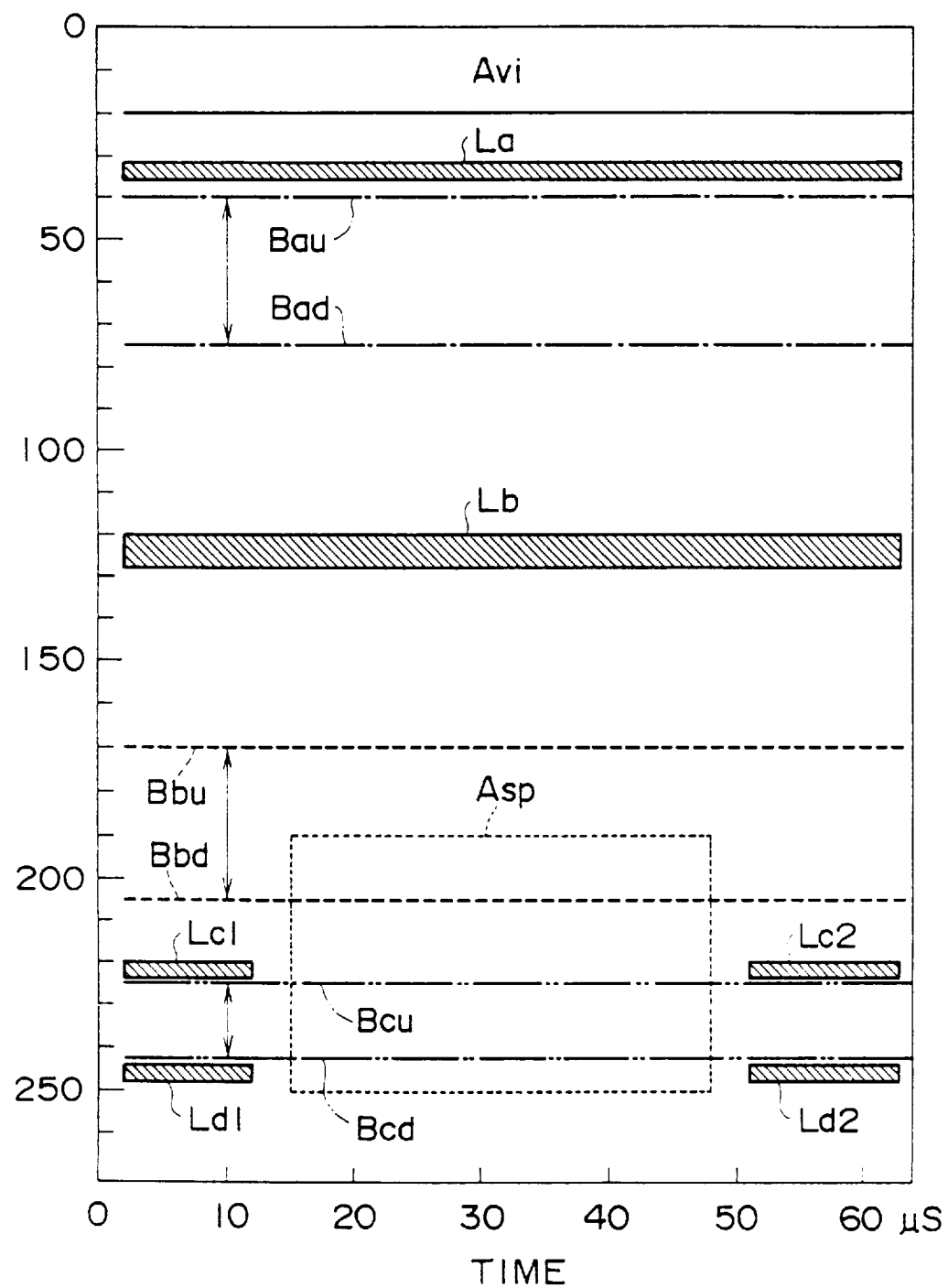
FIG. 3 is a diagram illustrating the concept for explaining operations of the essential portion of an embodiment of the present invention.

Namely, the region defined from the end of vertical blanking period Avi to the line 40 and the region defined from the line 242 to the line 262 in the video signal of a field are used only by the standard picture having the aspect ratio of 4:3 as shown in FIG. 3 and these regions are used as the blanking regions in the software for wide display screen of the letter box type as explained above.

As is already explained, a letter box type software contains the picture in different positions. The upper edge of the vista size and CinemaScope size is ranged in the line 40 to line 75 provided between the chain line Bau and the chain line Bad in FIG. 3.

Meanwhile, the lower edge of the CinemaScope size is ranged in the line 170 to line 217 as is indicated in the range between two chain lines Bbu and Bbd in FIG. 3 and the lower edge of the vista size is ranged in the line 225 to line 242 as is indicated in the range between two chain lines Bcu and Bcd shown in FIG. 3.

In this embodiment, a video signal existence detection line region is set for a plurality of lines, based on the investigation results explained above, in the upper and and lower end portions where the blanking region in the software is for the wide display screen of the letter box type, in the center region of the display screen, and in the lower portion of the display screen where the blanking region only for the CinemaScope size is.

That is, as indicated as the hatched areas in FIG. 3, a first detection line region La is set, for example, for the line 3 to the line 36 at the upper end portion of the display screen, a second detection line region Lb is set, for example for the line 120 to the line 127 at the center of the display screen and a third detection line Lc is set, for example, for the line 220 to the line 223 at the lower end portion of the display screen. Moreover, a fourth detection line region Ld is set for the line 244 to the line 247 at the lower end portion. The third detection line region Lc becomes the blanking region only for the CinemaScope size display mode, while the fourth detection line region Ld becomes the blanking region for both CinemaScope size and vista size display mode.

The detection line region setting circuit 421 outputs the detection line region signals Sa, Sb, Sc, Sd which become "1" in the periods of the four detection line regions La, Lb, Lc, Ld with respect to the above horizontal lines.

In the case that software offers a foreign film, the superimposed dialogues are displayed at the lower part of the display screen. Usually, both ends portions in the horizontal direction are not used for display of the superimposed dialogues and the superimposed dialogue display region is defined by the region Asp enclosed by a broken line in FIG. 3. The superimposed dialogue display region is the blanking region for the letter box type software for the wide display screen, but the superimposed dialogue may happen to be detected as the picture.

Therefore, in this embodiment, as the third and fourth detection line regions Lc, Ld, only the regions Lc1, Lc2 and regions Ld1, Ld2 which are not used for display of superimposed dialogue at both right and left end portions of the display screen are set as the actual detection regions as shown in FIG. 3, avoiding the superimposed dialogue display region Asp.

The window signal generating circuit 422 is composed, for example, of a saw-tooth wave generating circuit formed as a comparator or of an adequate counter for counting the clocks to generate a window pulse which becomes "1" in the period except for the superimposed dialogue display region Asp of FIG. 3 among the one horizontal scanning period.

This window pulse is supplied respectively to the AND gates A1 and A2 as first inputs thereof and the output signals Sc and Sd corresponding to the third and fourth detection line regions Lc and Ld from the detection line region setting circuit 421 are respectively supplied to the AND gates A1 and A2 as the other inputs thereof. Therefore, the AND gates A1, A2 provide the detection region signals Scc, Sdd which become "1" only in the regions Lc1, Lc2 and regions Ld1, Ld2 shown in FIG. 3.

Here, if existence of a picture is judged when a picture is detected from any one of the right and left regions among the regions Lc1, Lc2 or regions Ld1, Ld2, a special software, where the superimposed dialogue display region Asp is located, for example, at the right or left end portion of the display screen can also be applied.

The detection region signals Sa, Sb, Scc, Sdd obtained as explained above are supplied to the video signal existence detection circuit 43. This video signal existence detection circuit 43 is composed of a slice circuit 431, a signal gate circuit 432, four latch circuits 433a, 433b, 433c, 433d, each of which is respectively formed of RS flip-flop circuit, and four AND gates Aa, Ab, Ac, Ad.

Each circuit of the four latch circuits 433a, 433b, 433c, 433d is reset by the front edge of a video mode discrimination request signal REQ from the system control circuit 31. The signal gate circuit 432 opens only when the video mode discrimination request signal REQ is outputted from the system control circuit 31.

The detection region signals Sa, Sb, Scc, Sdd are respectively supplied to the four AND gates Aa, Ab, Ac, Ad as shown in the figure. Therefore, the AND gates Aa, Ab, Ac, Ad are respectively opened for the detection regions La, Lb, Lc1 and Lc2, Ld1 and Ld2.

Meanwhile, an input video signal Sv is applied to the slice circuit 431 and thereby an output signal which becomes "1" in the duration of the video signal having the predetermined slice level which is set previously can be obtained from this slice circuit 431. That is, the output signal of the slice circuit 431 becomes "1" in the picture existing period or "0" in the picture no-existing period. In the case of this example, the slice level of this slice circuit 431 is set, for example, to the 35 to 40 IRE level.

An output signal of this slice circuit 431 is applied respectively in common to the four AND gates Aa, Ab, Ac, Ad through the gate circuit 432. Therefore, outputs of the four AND gates As, Ab, Ac, Ad become "1" for existence of the video signal having the level higher than the slice level in the detection regions La, Lb, Lc1 and Lc2, Ld1 and Ld2 where such AND gates are opened or "0" for no-existence of the video signal. The outputs of the AND gates Aa, Ab, Ac, Ad are respectively supplied to the set terminals of the RS flip-flop circuits forming the latch circuits 433a, 433b, 433c, 433d.

Therefore, if the video signal exists in the detection regions La, Lb, Lc1 and Lc2, Ld1 and Ld2 while the video mode discrimination request signal REQ is outputted from the system control circuit, an output of the AND gate corresponding to each detection region becomes "1". Accordingly, the RS flip-flop circuit to which an output of the relevant AND gate is applied is set and provides an output "1".

As explained above, a plurality of picture existence detection information Da to Dd in the detection regions La, Lb, Lc1 and Lc2, Ld1 and Ld2 can be obtained from the four latch circuits 433a, 433b, 433c, 433d. Since the latch circuits consisting of the RS flip-flop circuits are provided, the picture detection output may be maintained in the period where the video mode discrimination request signal REQ is generated. Therefore, malfunction due to the change of video signal level can be made lesser in comparison with that in the picture detection with only the predetermined timing.

Here, it is enough that the video mode discrimination request signal REQ is transmitted, for example, once in every several seconds, from the system control circuit 31.

As will be apparent from FIG. 3, since the detection regions La, Lb, Lc1 and Lc2, Ld1 and Ld2 are set to avoid the superimposed dialogue display region Asp, existence of the superimposed dialogue displayed cannot be detected directly. Therefore, when the superimposed dialogue inserted in the blanking region is displayed in the zoom mode in the case of a wide display software, such superimposed dialogue may be displayed outside the display screen.

Therefore, in this embodiment, a superimposed dialogue signal detection circuit 60 is provided in the video detection circuit 40 in order to detect existence of the inserted superimposed dialogue. As shown in FIG. 2, the superimposed dialogue signal detection circuit 60 is provided with an inverter 61, AND gates A3 to A6, an OR gate 62 and a latch circuit 63 consisting of an RS flip-flop circuit.

An window signal from the window signal generating circuit 422 is supplied to first input terminals of the AND gates A3, A4 through the inverter 63 and the signals Sc, Sd indicating the detection line regions Lc, Ld at the lower part of the display screen sent from the detection line region setting circuit 421 are then respectively supplied to the other input terminals of the AND gates A3, A4. Therefore, the signals Scp, Sdp which become "1" in the superimposed dialogue display region Asp among the detection line regions Lc, Ld can be obtained from the AND gates A3, A4 and these signals Scp, Sdp are then applied to first input terminals of the AND gates A5, A6. An signal from the signal gate circuit 432 is supplied to the other input terminals of the AND gates A5, A6. Therefore, outputs of the AND gates A5, A6 become "1" in the period where the superimposed dialogue signal exists in the superimposed dialogue region at the lower part of the display screen.

Outputs of the AND gates A5, A6 are supplied to the set terminal of the RS flip-flop circuit forming a latch circuit 63. This latch circuit 63 is reset with the front edge of the video mode discrimination request signal REQ explained previously. As a result, when the superimposed dialogue signal is detected, the latch circuit 63 is set, providing an output Dp of the level "1".

Now, returning to FIG. 1, whether a picture exists or not in the detection regions La, Lb, Lc1 and Lc2, Ld1 and Ld2 respectively is detected by the video detection circuit 40 as explained above, a plurality of the video detection information Da to Dd from the video detection circuit 40 and superimposed dialogue signal detection output Dp are supplied to the logic gate circuit 50.

This logic gate 50 is formed to embody a logical table shown in FIG. 4 when no-existence of the superimposed dialogue signal is judged by the superimposed dialogue signal detection output Dp and thereby a display mode information corresponding to the input video signal Sv is outputted from the logic gate circuit 50, on the basis of the four pieces of video detection information Da to Dd from the video detection circuit 40.

The system control circuit 31 extracts a deflection control data stored in ROCM 31 depending on the display mode information from the logic gate circuit 50 and then supplies this data to the vertical and horizontal deflection waveform processing circuits 24, 26.

Figure 5A:
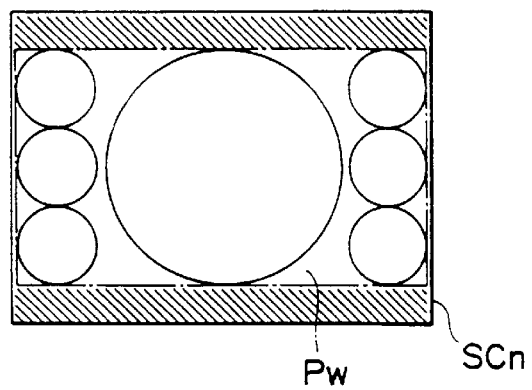
FIGS. 5A–5C are conceptional diagrams for explaining the prior art.
Figure 5B:
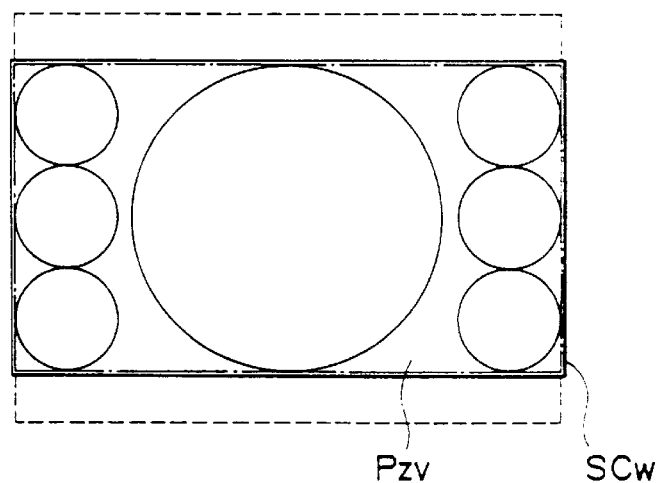
Figure 5C:
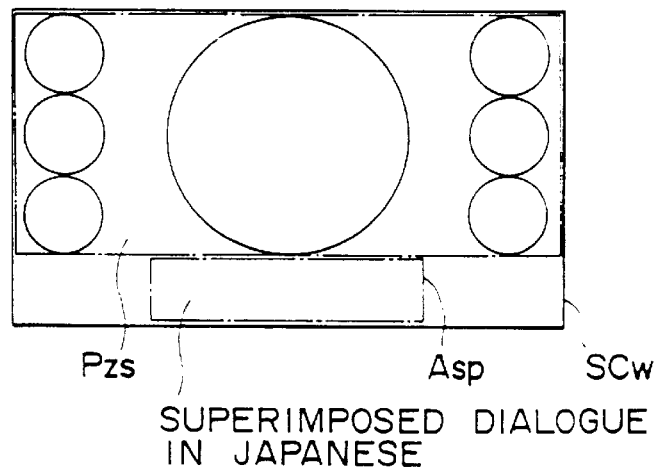
Figure 7:
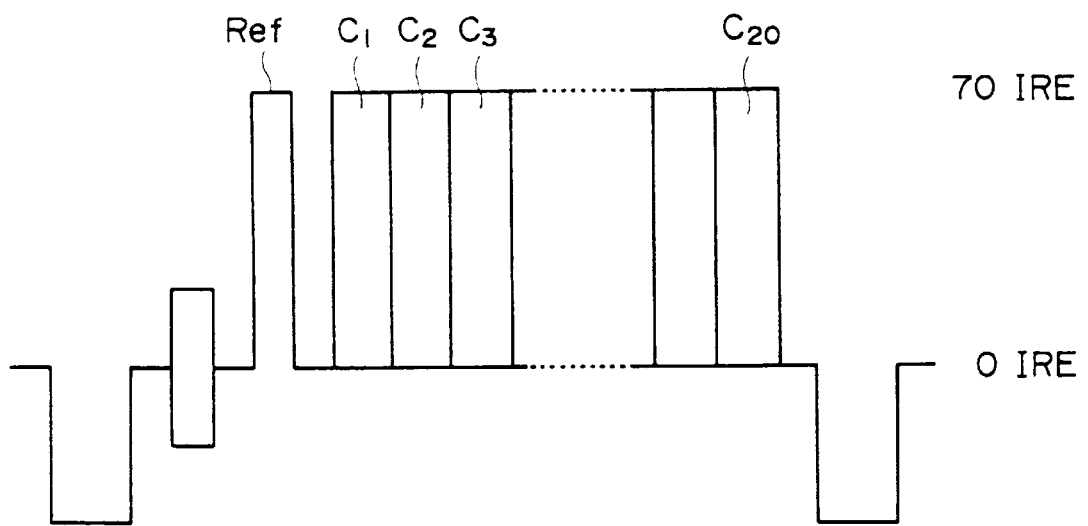
FIG. 7 shows a waveform of a signal for explaining the prior art.

Moreover, when any one of the vista size and CinemaScope size is detected from a plurality of output information Da to Dd of the video signal existence detection circuit 43, if existence of the superimposed dialogue signal is detected with an output Dp of the superimposed dialogue signal detection circuit 60, a signal is outputted to suggest how to adequately select the display of picture. For instance, when any one of the vista size and CinemaScope size is detected from an output of the video signal existence detection circuit 43, if existence of the superimposed dialogue signal is detected with an output of the superimposed dialogue signal detection circuit 60, the system control circuit 31 sets in a little upper side the scroll of display screen in the vertical direction as shown in FIG. 5C to set up the display mode to correctly display the superimposed dialogue at the lower side of the display screen SCw.

In the manner as explained above, the optimum display mode just suitable for material of the input video can be selected automatically when a television broadcast program is received and a video software is reproduced.

The video signal detection circuit 40 can comparatively be structured easily at a low cost with a line counter 41, a window signal generating circuit 422, an Rs flip-flop and a plurality of AND gates.

When a detected output of the second detection region Lb which becomes "1" in each display mode is inverted to "0" as shown in FIG. 4, it means that an input video signal does not exist. Therefore, in this case, an application can be determined as desired. For instance, setting of the display mode is not changed or the display mode is set to the normal mode, etc.

As explained above, according to the present invention, video signal existence detection means for setting a plurality of detection regions to each field of the input video signal to detect existence of a picture in each detection region and display mode selecting means for selecting any one of a plurality of display modes on the basis of the detected output of the video signal existence detection means are provided and thereby a display mode just suitable for the material of the input video signal can be selected automatically.

Moreover, in the present invention, a picture size can be detected accurately by detecting existence of a picture from the detection line regions located outside the superimposed dialogue detection region.

In addition, the superimposed dialogue signal detection circuit is provided to consider its detected output. Thereby, the picture can be controlled to be displayed in the most adequate picture display mode so that the superimposed dialogues are always displayed correctly within the display region.

What is claimed is:

1. A video receiver for displaying a video signal formatted according to one of a plurality of predetermined signal aspect ratios comprising:

a video display with a predetermined display aspect ratio;

a video signal input means for receiving said video signal;

a threshold detector for generating a logical signal when said video signal received from said input means is above a predetermined threshold;

a line counter for determining a line number for each horizontal scan line following a vertical synchronization signal of said video signal received from said input means;

a line selector for generating a plurality of logical signals when said line number is within one of a plurality of predetermined ranges;

logical gate means for generating a plurality of detection signals when the logical signal from said threshold detector indicates said video signal is above said predetermined threshold and the logical signals from said line selector indicate that a current scan line is within one of said plurality of predetermined ranges; and format determining means for comparing the plurality of detection signals from said logical gate means to determine the one of said plurality of predetermined signal aspect ratios represented by said video signal.

2. The video receiver according to claim 1 further comprising:

display area selection means for selecting an optimal display area of said video display based on the determined signal aspect ratio and on the predetermined display aspect ratio of said video display; and display area modification means for modifying an active area of said video display based on the area selected by the display area selection means.

3. The video receiver according to claim 2 wherein said video display is a cathode ray tube and wherein said display area modification means modify said display area by varying a range of deflection signals sent to said cathode ray tube.

4. The video receiver according to claim 1 wherein said logical gate means includes signal disabling means for disabling detection of a predetermined segment of a horizontal scan line, said predetermined segment being in an area of a video frame of said video signal reserved for a text display.

5. The video receiver according to claim 4 wherein said signal disabling means comprises:

text display detection means for generating a logical signal when a text display signal is present in said video signal; and second logical gate means for disabling one or more of said plurality of detection signals generated by said logical gate means when the logical signal from said text display detection means indicates that the text display signal is present in said video signal.

* * * * *